(12) United States Patent
Marlow et al.

(10) Patent No.: US 8,892,139 B2
(45) Date of Patent: Nov. 18, 2014

(54) SYSTEMS AND METHODS ENABLING A SHORT MESSAGE SERVICE GATEWAY VIA CLOUD COMPUTING SERVICES

(71) Applicant: Ethersms LLC, Rockville, MD (US)

(72) Inventors: William J. Marlow, Herndon, VA (US); Robert Cichielo, Asbury, NJ (US); Emil Sturniolo, Medina, OH (US); Paul Benware, Mendon, NY (US)

(73) Assignee: Ethersms, LLC, Rockville, MD (US)

( * ) Notice: Subject to any disclaimer, the term of this patent is extended or adjusted under 35 U.S.C. 154(b) by 0 days.

(21) Appl. No.: 13/671,054

(22) Filed: Nov. 7, 2012

(65) Prior Publication Data
US 2013/0288721 A1 Oct. 31, 2013

Related U.S. Application Data

(60) Provisional application No. 61/556,734, filed on Nov. 7, 2011, provisional application No. 61/562,314, filed on Nov. 21, 2011.

(51) Int. Cl.
*H04W 88/02* (2009.01)
*H04W 4/14* (2009.01)

(52) U.S. Cl.
CPC .................................... *H04W 4/14* (2013.01)
USPC .......................................................... 455/466

(58) Field of Classification Search
USPC .............. 455/466, 406; 707/738; 340/573.1, 340/539.13; 715/738; 370/329; 719/328
See application file for complete search history.

(56) References Cited

U.S. PATENT DOCUMENTS

| | | | |
|---|---|---|---|
| 2012/0239417 A1* | 9/2012 | Pourfallah et al. | 705/2 |
| 2012/0239560 A1* | 9/2012 | Pourfallah et al. | 705/40 |
| 2013/0030828 A1* | 1/2013 | Pourfallah et al. | 705/2 |

OTHER PUBLICATIONS

MMS Center Application Development Guide, Version 1.0, Apr. 3, 2002, Nokia Corporation, 24 pages.

* cited by examiner

*Primary Examiner* — Diane Mizrahi
(74) *Attorney, Agent, or Firm* — Nixon & Vanderhye P.C.

(57) ABSTRACT

A solution enables the exchange of SMS or other short messaging information via alternate paths than cellular operators infrastructure and allows for communications with standard devices that may not be party to the additional service.

24 Claims, 9 Drawing Sheets

ETHER SMS PORTAL

Home    Account    Messages

Logged User: hudamann@email.com
Change Password | Sign Out

ACCOUNT INFORMATION

| Account Property | Value |
|---|---|
| Name | Huda Mann |
| Logon | hudamann@email.com |
| Created On | 10/29/2011 8:20:30 PM |
| Status | Active |
| Balance | $75.08 |
| Last Replenished | n/a |
| Message Cost/Plan | $0.02 |
| Phone Number | +1999-555-1212   remove |

Use the following section to search for available telephone numbers. When you have found a number that you desire, click the add button and it will be assigned to your account.

Please enter U.S. area code: [      ] (List Available)    Available phone numbers: [    ▲▼]  (Add Number)

You may enter a valid area code such as 732 or search for 732555* for pattern matches.

SYSTEMS AND METHODS ENABLING A SHORT MESSAGE SERVICE GATEWAY VIA CLOUD COMPUTING SERVICES

CROSS-REFERENCES TO RELATED APPLICATIONS

This application claims the benefit of the following provisional applications incorporated herein by reference:

U.S. Provisional Patent Application No. 61/556,734 filed Nov. 7, 2011 entitled "Systems And Methods Enabling A Short Message Service Gateway Via Cloud Computing Services"; and U.S. Provisional Patent Application No. 61/562,314 filed Nov. 21, 2011 entitled "Systems And Methods Enabling A Short Message Service Gateway Via Cloud Computing Services".

This application is related to the following copending US patent applications incorporated herein by reference:

U.S. patent application Ser. No. 12/940,213 filed Nov. 5, 2010;

U.S. Provisional Patent Application No. 61/351,979 filed Jun. 7, 2010;

U.S. Provisional Patent Application No. 61/556,652 filed Nov. 7, 2011 entitled "Systems And Methods Using One Time Pads During The Exchange Of Cryptographic Material" and counterpart non-provisional application Ser. No. 13/670,994 filed Nov. 7, 2012; and U.S. Provisional Patent Application No. 61/557,598 filed Nov. 9, 2011 entitled "Systems And Methods For Enabling Secure Messaging, Command, And Control Of Remote Devices, Communicated VIA A Short Message Service Or Other Message Oriented Communications Mediums" and counterpart non-provisional Application Ser. No. 13/671,026 filed Nov, 7, 2012.

STATEMENT REGARDING FEDERALLY SPONSORED RESEARCH OR DEVELOPMENT

None.

FIELD

The technology herein relates to the exchange of message oriented data over alternative communications paths. It provides for access to Short Message Service (SMS) and other message communications via alternative network interconnects.

BACKGROUND AND SUMMARY

Today, a significant amount of information is communicated via the Short Message Service (SMS) or so-called "texting" infrastructure that is provided by mobile phone carriers worldwide. This vital communications channel has proven useful during times when other channels of communications such as voice and data networks are either overloaded or inaccessible, especially during natural or man-made disasters. For example, during the 9/11 terrorist attacks and during a recent tsunami disaster in Japan, people were able to communicate via texting even when no voice or data service was available.

The popularity of texting (SMS) communications for consumers has continued to explode over the years. "During the 2009 calendar year, there were more than 1.5 trillion text messages reported on carriers' networks."

http://www.ctia.om/media/press/body.cfm/prid/1936

The same report indicates that more than 5 billion messages are sent per day over this infrastructure. However much of texting communications is limited to cellular enabled devices. There is a class of devices that fall into a category of SMS constrained systems due to the lack of cellular connectivity.

While there is a considerable body of prior art that enables some constrained devices to send SMS messages to cellular enabled systems, most of these gateways provide access: a) one way—mostly used for messaging to the device or handset (e.g., using Skype as one example); and/or b) through traditional email gateways that add significant overhead, further reducing the amount of data that can be communicated due to the brevity of the standard SMS communications channel (e.g., 160 7-bit characters per message).

Cellular telephone carriers often provide email gateways to enable such communications (e.g., for Verizon in the US the gateway is phonenumber@vtext.com), however they may reduce the priority and rate at which these messages are processed, and are generally only inbound. There are also third party service provider messaging services that are tightly integrated with enterprise applications and websites, and can process and originate bulk SMS messages but generally do not receive or permit any replies.

It is also possible to access SMS through microblogging services such as Twitter, but Twitter is generally used to broadcast to a number of followers rather than for providing secure point-to-point communications.

While texting has become pervasive, many systems today are unable to participate in any correspondence via this technology, and/or are saddled with additional overhead when communicating information to peer systems through existing gateway infrastructure.

Taking a different approach than many typical commercially available offerings, exemplary illustrative non-limiting technology herein provides a cloud enabled service that provides access to SMS services by devices having no cellular connectivity. Alternatively, devices that do have cellular connectivity may now have access to SMS services in a more cost efficient manner especially when roaming onto foreign or partner networks.

One non-limiting illustrative arrangement provides a web-enabled service that acts as a bridge between Internet connectivity and SMS communications. Based on cloud computing methodology, an exemplary illustrative non-limiting example exposes secure web services that can be used by applications to send and receive SMS or other message oriented correspondence from other SMS or otherwise enabled peer devices. Furthermore, these cloud-based services can in illustrative implementations be front-ended by a user-friendly web base portal that allows an individual or an organization to manage their account simply. Additional facilities through the web interface allow SMS or other message oriented communications to be exchanged with peer systems.

Given the popularity of this type of communications today, it is highly desirable to provide a solution that allows for SMS constrained devices to participate as peers to the other cellular enable devices over alternate communications media such as the Internet. In particular, it would be highly desirable to provide a solution that enables the exchange SMS or other message oriented communications over multiple communications paths.

The illustrative non-limiting Solution-as-a-Service (SAAS) provides illustrative devices, systems and methodology to use the Internet or other networks to seamlessly bridge messages to and from cellular network SMS communications paths. Unlike other available SMS gateway services available today, exemplary illustrative non-limiting technology herein provides an enterprise and/or consumer oriented services that provide Direct Inward Dialing (DID) functionality for each account. This capability can be used to enable any SMS enabled device to send messages to other enabled device(s) natively. No additional translation is required by a carrier network infrastructure or handset in example non-limiting implementations, providing for full utilization of the SMS communications channel without additional overhead.

Exemplary illustrative non-limiting services also provide a potential for cost reductions to customers even for systems and devices that have cellular connectivity. Consider a user who is traveling internationally. Traditionally, when a cellular enabled device roams off of its home carrier to a partner network, significant charges are typically assessed to the user of the partner network's services. However, many of these cellular devices are also equipped with Wifi interconnects. Through the use of Internet connectivity via a potentially more cost effective (e.g., often free) Wifi network, the cellular device can use the alternative exemplary illustrative non-limiting services detailed herein to continue to bidirectionally send and receive SMS messages to its peers at a fraction of the cost associated with the visiting cellular carrier's network.

Alternatively, there may be circumstances where alternative non-limiting communications as described herein never need to use the cellular carrier network services at all, further reducing costs. Consider if both peer devices have established accounts. The exemplary illustrative non-limiting communications described herein never needs to traverse outside the alternative infrastructure as it can be handled by routing within the service infrastructure itself.

Other uses can also be considered. Consider a device such as an Apple Corporation iPad or other tablet or desktop device running operating systems such as Google Android or Microsoft Windows that does not have cellular connectivity. In this case, with the added functionality of an application to enable alternatively-directed SMS messaging over a different network, these devices can now easily participate in SMS communications with other peer devices. Such services can for example be made available via standard Internet communications protocols such as HTTP(s) as one example. By using such standard protocols, access may be available in many managed network communications paths where proprietary protocols are disallowed potentially through the use of firewalls, etc.

Another example non-limiting scenario is the Apple iOS or other tightly controlled operating system technologies that may limit programmatic access to SMS communications on systems that may have cellular connectivity such as the iPhone, iPad, etc. In such systems, a third party application developer may be unable to gain access to the short message service API's in the device operating system. Third party applications on the device thus can be used to send an SMS though other resident native applications, but may not be possible for a third party application on such devices to directly send an SMS itself without going through another resident native application. This may be undesirable from a user experience standpoint (e.g., requiring the user to request a "send" twice).

In these instances, the exemplary illustrative non-limiting technology herein enables third party applications to be developed that can use data connections (e.g., WiFi) to fully utilize and enhance the capabilities of the device to participate in communications over SMS channels. Exemplary illustrative non-limiting applications may for example allow messages to be exchanged privately between cooperating peers systems, over either the traditional cellular SMS communication path or via data network interconnects (4g, 3g, 2g, WiFi, WiMax, Bluetooth, Ethernet, etc.) Such peer systems thus need not be resident users of SMS—they can be any device that has an SMS-enabled application. An SMS message sent back by such a device will be converted back to a data channel-enabled message that can in turn be sent back via data communications infrastructure to the application running on the device. This allows the SMS infrastructure on the iPhone or other similar device to be sidestepped and yet still enable timely bidirectional SMS messaging.

Furthermore, due to the use of standard Internet protocols such as HTTPS, not only can bidirectional communications flow through conventional network infrastructure, but security and anonymity can be enhanced for SMS or other messaging oriented communications by using the anonymzing services such as for example the TOR project (http://www-.torproject.org). Tor is a network of virtual tunnels that allows people and groups to improve their privacy and security on the Internet. It also enables software developers to create new communication tools with built-in privacy features. Tor provides the foundation for a range of applications that allow organizations and individuals to share information over public networks without compromising their privacy. Individuals use Tor to keep websites from tracking them and their family members, or to connect to news sites, instant messaging services, or the like when these are blocked by their local Internet providers. Tor's hidden services let users publish web sites and other services without needing to reveal the location of the site. Individuals also use Tor for socially sensitive communication: chat rooms and web forums for rape and abuse survivors, or people with illnesses.

Exemplary illustrative non-limiting applications herein can be enhanced to include TOR or other anonymizing capabilities, reducing the possibility of exposing the intended communications between peers. This functionality may be useful for example to individuals in situations where confidentiality of exchanging messages with peers is of utmost importance. The actual ultimate destination of a particular message can be kept private from malicious or nefarious third parties over local data interconnect networks. In contrast, such messages sent from a conventional SMS client over a conventional SMS messaging network can be fairly easily tracked (e.g., based on cellular phone number), compromising the security and safety of clandestine operators.

Using such anonymizing services, it is possible to hide that the device is even connection to SMS messaging in the first place (the connection looks instead like a conventional internet connection). Such arrangement can provide full anonymity. An attacked will not be able to discern (a) that the device is sending a message, (b) to whom any communication is being sent, and (c) who any communication is being received from. The only information discernible from the data traffic is that one IP address is connecting to another IP address somewhere out on the Internet.

Still another illustrative application provides a movable command and control center that can connect bidirectionally via different network points of presence and/or IP addresses (e.g., by rotating IP addresses). Because this is an outbound service, it is possible to change IP addresses on a per exchange basis, and validation of secure credentials is used instead of IP address to provide bidirectional communications over time.

Management services built on top of standard operating systems such as Linux, Windows, MacOSX, etc. or other TCP/IP environments can now easily send/receive SMS messages to/from other devices. For instance, it is now possible to enable users to send messages along with secure command and control information (e.g., issuing remote commands to the device to locate a device, disable or enable certain device functionality, etc.) to SMS or non-SMS enabled devices via a Web interface. The Web interface can be locally housed within an enterprise or at a managed service location somewhere within the Internet Cloud.

Additionally, one-to-one or one-to-many messaging applications can also be simply developed such as for pointcasting, microblogging, etc. Other enterprise applications such as for example a Customer Relations Management (CRM) application can be enhanced to use such services, thus providing another avenue for corporations to establish two-way communications with their customers/consumers.

Unlike other messaging gateway services where the corporation may need a point of presence on the Internet to receive inbound communications, exemplary illustrative non-limiting implementations further reduce a possible exposer to malicious attack vectors. All communications in example non-limiting implementations can initially be by a peer system such as within a corporate firewall opening an outbound (bidirectional) data communications path through the firewall—removing the requirement for an entity to open up access through a firewall or other defensive systems for inbound communications. Anonymity can be further enhanced by using the aforementioned TOR functionality or at minimum regularly changing endpoints point of presence on the Internet.

Some example methods may involve the user acquiring a phone number (D10) which has an associated monthly cost/fee. In other arrangements, etherSMS will allow the destination to be one of the following:

A valid mobile phone number

A virtual etherSMS phone number

A etherSMS logon name/identity (all etherSMS accounts sign-on using a unique e-mail id as their identity)*

A "validated" mobile number (see process below)*

The two items (marked with *) can for example be actual look-ups within the etherSMS network. When a destination is presented, the internal systems may determine if a) the destination is an e-mail address and b), determine if said address matches any of the uniquely created accounts within the etherSMS network. If a match is detected, the message is routed "in-network" and assigned to the intended user.

An additional method may also be implemented whereby a user may wish to use their existing mobile phone's number as a means to route messages through the etherSMS network. Using the account "portal", an etherSMS subscriber may enter a valid mobile phone number as a form of additional routing information. To prevent spoofing and other nefarious activity in certain illustrative implementations, a mobile phone number used for identification may be validated as a condition for use. The validation process used by etherSMS will send a random or pseudo-random number code to the specified number. Since only the rightful owner of the mobile device may see the random number, this process verifies that it does indeed reside in their possession. Once the numeric code received on the mobile handset is verified in the user portal, the number is "validated" and accepted.

Once validated, the in-network routing mechanisms now route messages in-network based on matches to validated phone numbers as well. Alternatively, the verification information exchange could be provided to the user via email, voice callback, etc.

Giving an entity the ability to have multiple identities potentially associated with more than one device, etherSMS can also route messages to the entities' multiple devices. For example, a user may have a cellphone and an iPad. The user would like messages to appear on both systems. A relationship can be set up so that messages received or sent are replicated to the other devices, allowing the user to continue the exchange from any one of the associated devices.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Illustrative Cloud Services for Message Oriented Communications

Figure 1:
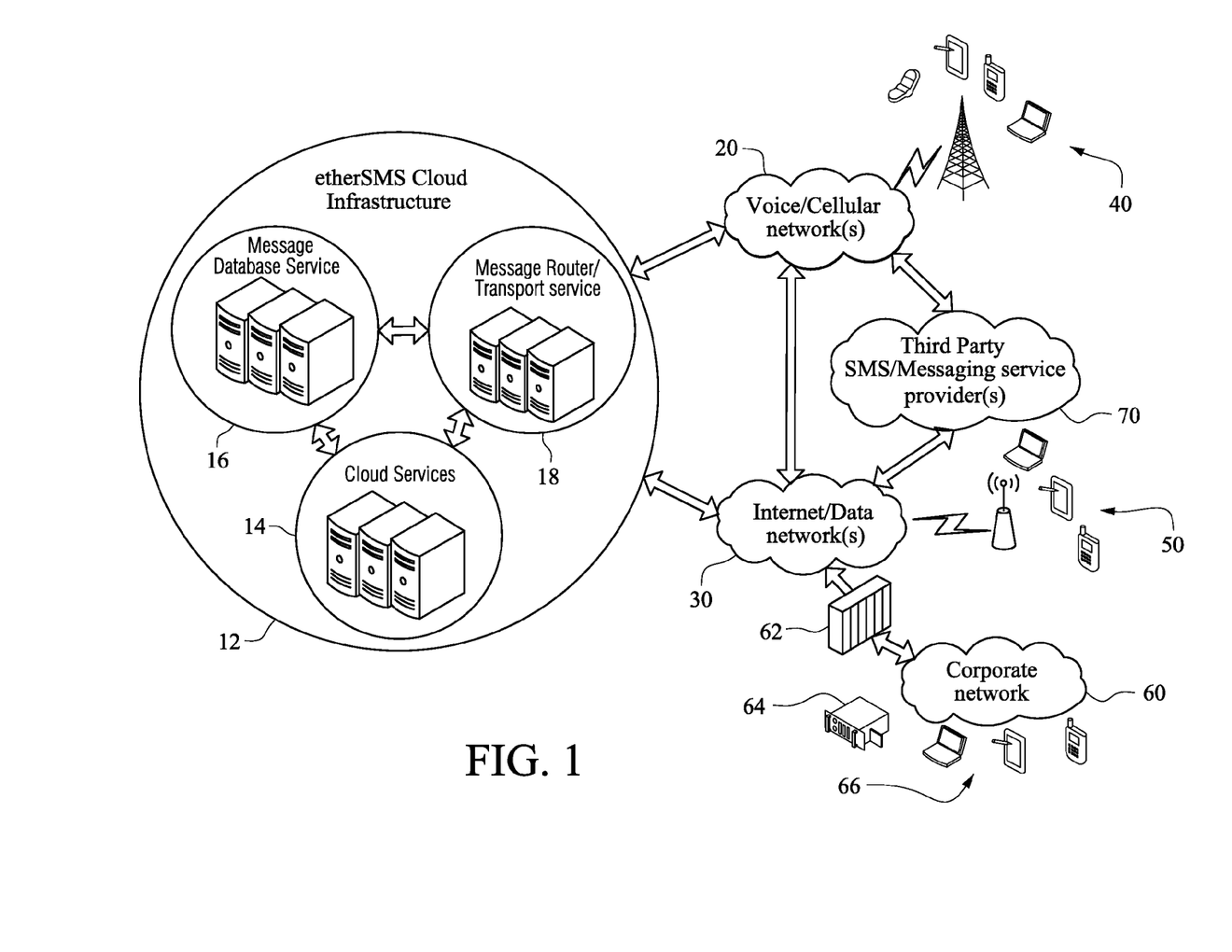
FIG. 1 is an example non-limiting illustrative block system diagram.

FIG. 1 shows an example non-limiting system 10 that can be used to enable the exchange of message oriented communications between cooperating peers via gateway services. The exemplary illustrative non-limiting technology herein provides an application that allows at least two peer systems to securely exchange message-oriented data across unsecure voice and/or data communications paths. Traditionally, this is done via the Short Message Service (SMS) communications path provide over wireless cellular carriers services.

The exemplary illustrative non-limiting system 10 of FIG. 1 includes a core infrastructure 12 connected to one or more voice/cellular network(s) 20 and one or more internet/data network(s) 30. The voice/cellular network(s) 20 are in turn in communication with a variety of cellular or other wireless devices 40 such as laptop computers, cellular telephones, tablet computers, smartphones, portable routers or hubs, or any other device capable of cellular and/or other mobile communications. Similarly, Internet/data network(s) 30 are in communication with a variety of internet or other network-connected devices 50 (e.g., laptop computers, tablet computers, wifi-enabled smartphones, etc.) via wired and/or wireless local or wide area network connections such as WiFi, Wimax, Ethernet, etc. Note that some of devices 50 may also be cellular enabled (i.e., the same devices may be able to connect to either or both of voice/cellular network(s) 20 and Internet/data network(s) 30) whereas other devices may connect just to the internet/data network(s) 30 or just to the voice/cellular network(s) 20.

Internet/data network(s) 30 are also in communication with one or more corporate local area, wide area and/or virtual networks 60 via a firewall(s) 62, router(s) 64, access points, etc. to provide communications with a variety of enterprise computing devices 66 such as laptop computers, tablet computers, etc.

As shown in FIG. 1, third party SMS/Messaging service provider(s) 70 communicate with voice/cellular network(s) 20 and/or Internet/data network(s) 30. Such SMS/messaging service provider(s) 70 provide messaging services across one or multiple networks—often for only outgoing SMS messages (e.g., unable to accept replies).

As shown in FIG. 1, the example non-limiting core infrastructure 12 has been flexibly designed to allow a deployment to scale. There can be three main components of exemplary non-limiting infrastructure 12 which are the:
1) Cloud Interface Service 14
2) Message Database Service 16
3) Message Transport Service 18.

In one particular example non-limiting implementation, cloud services module 14 provides for the Web Services API and Web UI. Message DataBase service 16 provides for configuration, account info, store and forward message service, etc. Message router/transport service 18 is the service that determines the next step to process a message (e.g., if a message is received, what account does it belongs to, how to store it, potentially how to indicate its arrival, where to route it next, is it to another etherSMS account?, etc. If its being sent, what message service to use (if any at all)? Is it sent to a third party aggregator like Twilio, directly to the cellular carrier network?, to a corporate (email) server?)

Each of these services 14, 16, 18 can be collocated on a single server or geographically/physically dispersed. Furthermore, each function can be distributed on more than one server allow for scaling with demand. For instance, in FIG. 1, the Cloud interface Service 14 can be located behind a commonly available load balancer used for Web service. The structure of each request is stateless allowing each request to be handled by a different Cloud Interface Service 14 system. Similarly, the Message Database Service 16, can be distributed across a multitude of computer server systems using start of the art replication services normally found in many commercially available SQL type database environments.

Distribution of Message Transport Service 18 across multiple systems can be used to further increase capacity of the number of messages that can be handled at any one. This can be done in more than one way. The Message Transport Service 18 can be configured to use different provider gateways to communicate directly with a carriers SMS infrastructure as well as other third party aggregators such as offered by companies like Twilio (http://www.twilio.com/). Using its message routing layer, the system can provide optimum least cost routing functionality potentially through a multitude of international partners, further reducing the overall cost of messaging to the consumer.

Figure 1A:
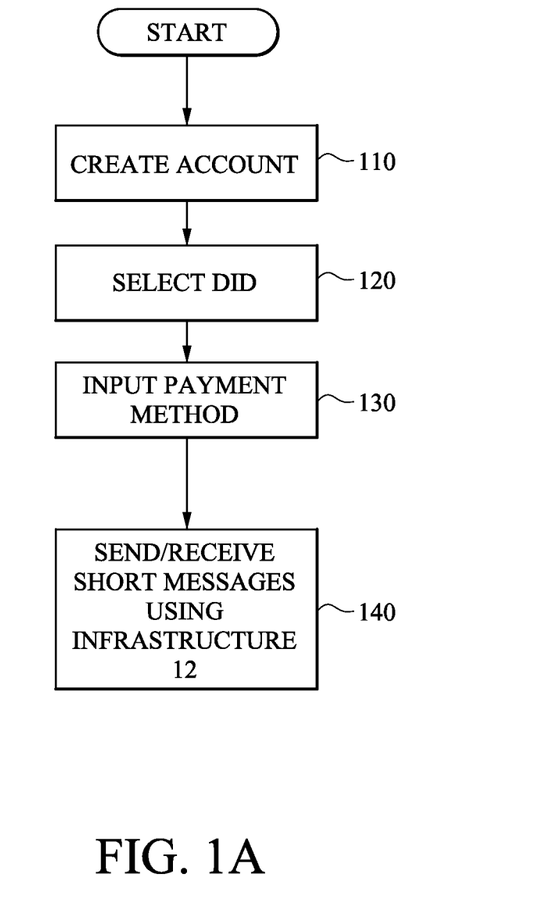
FIG. 1A is a flowchart of example non-limiting program control steps stored in a non-transitory storage device and executed by cloud services 14 to establish an account.
Figure 2:
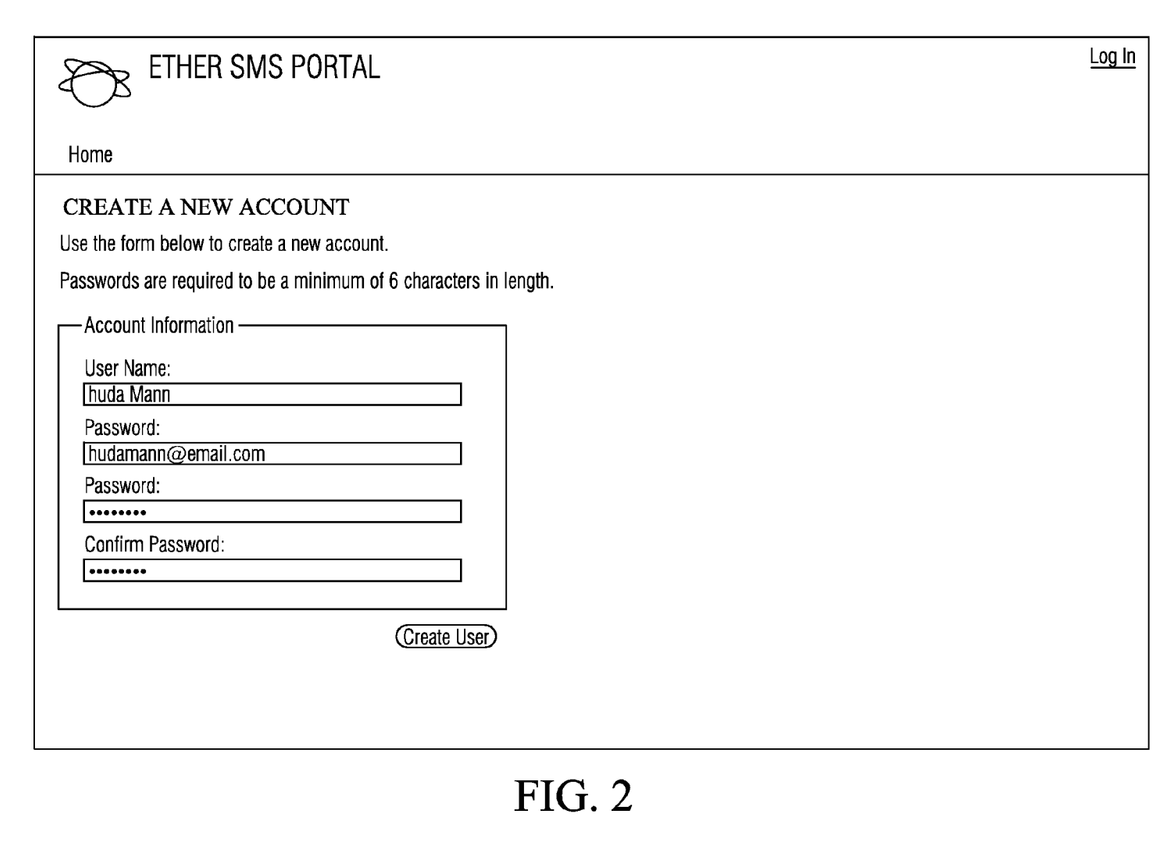
FIG. 2 is a sample of an illustrative non-limiting web page enabling a customer to create an account with an exemplary illustrative etherSMS™ portal.
Figure 3:
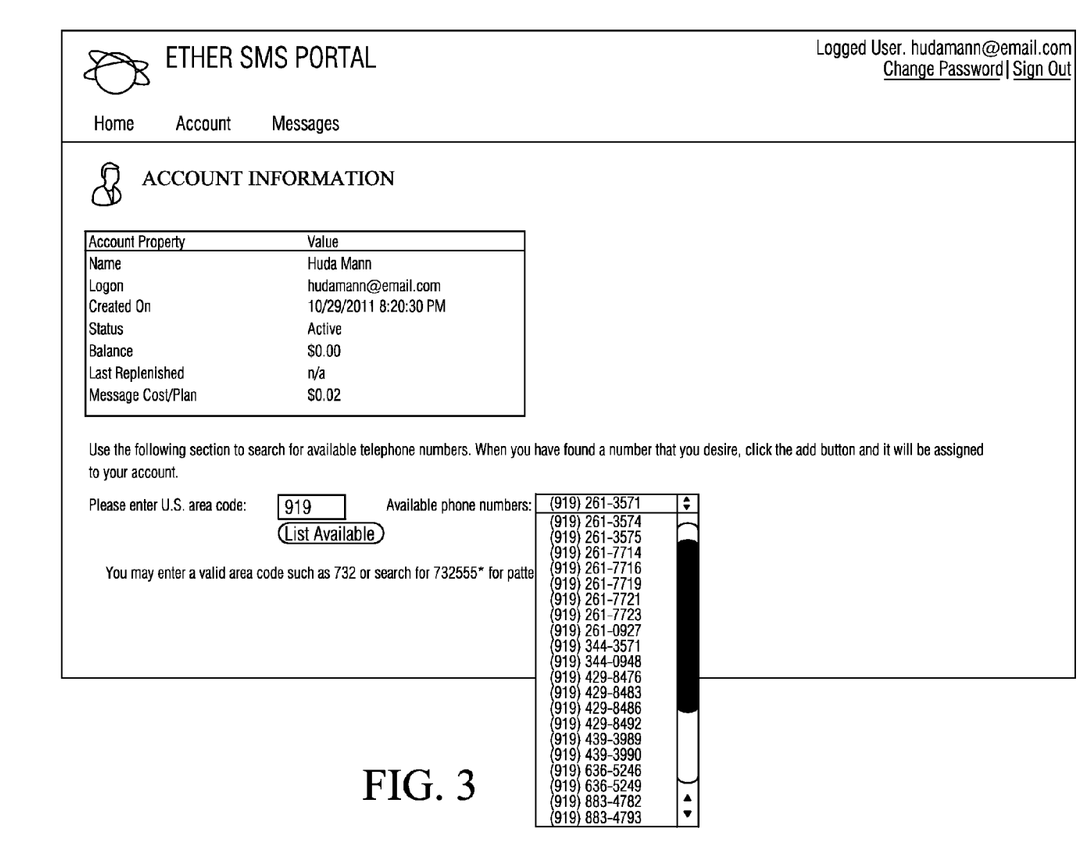
FIG. 3 is a sample of an example non-limiting web page allow a customer to select a Direct Inbound Dial (DID) number to be associated with an account.

To access the facilities, an individual or organization may first create an account with the exemplary illustrative non-limiting service in the manner shown in FIG. 1A. FIG. 2 depicts one exemplary embodiment of a non-limiting web page or other display used to create an account. Minimally certain credential information such as username and password may be requested or required to be entered to establish a user identity on the site (FIG. 1A, block 110). Ancillary information such as email address may also be created at this time. Once the customer has entered in their credentials, a check is made with an account database to ensure the uniqueness of the information. If a duplicate exists, the request to create an account is denied and the user is requested to modify and reenter information that would not conflict with existing account information. If successful, the customer would then proceed to the account page to select a DID to associate with this specific account as seen in FIG. 3 (FIG. 1A, block 120). In this exemplary embodiment, given a particular area code, a list of available phone numbers can be displayed to the user for their selection. Additional information may be collected such as credit card/paypal account or master account number (if the customer belongs to an organization), that enables the service to charge for the use of its services (FIG. 1A, block 130).

Once this information is entered and a DID is assigned to the account, a user can begin sending and receiving SMS or other message oriented communications (MMS, etc) via the portal (FIG. 1A, block 140).

Figure 4:
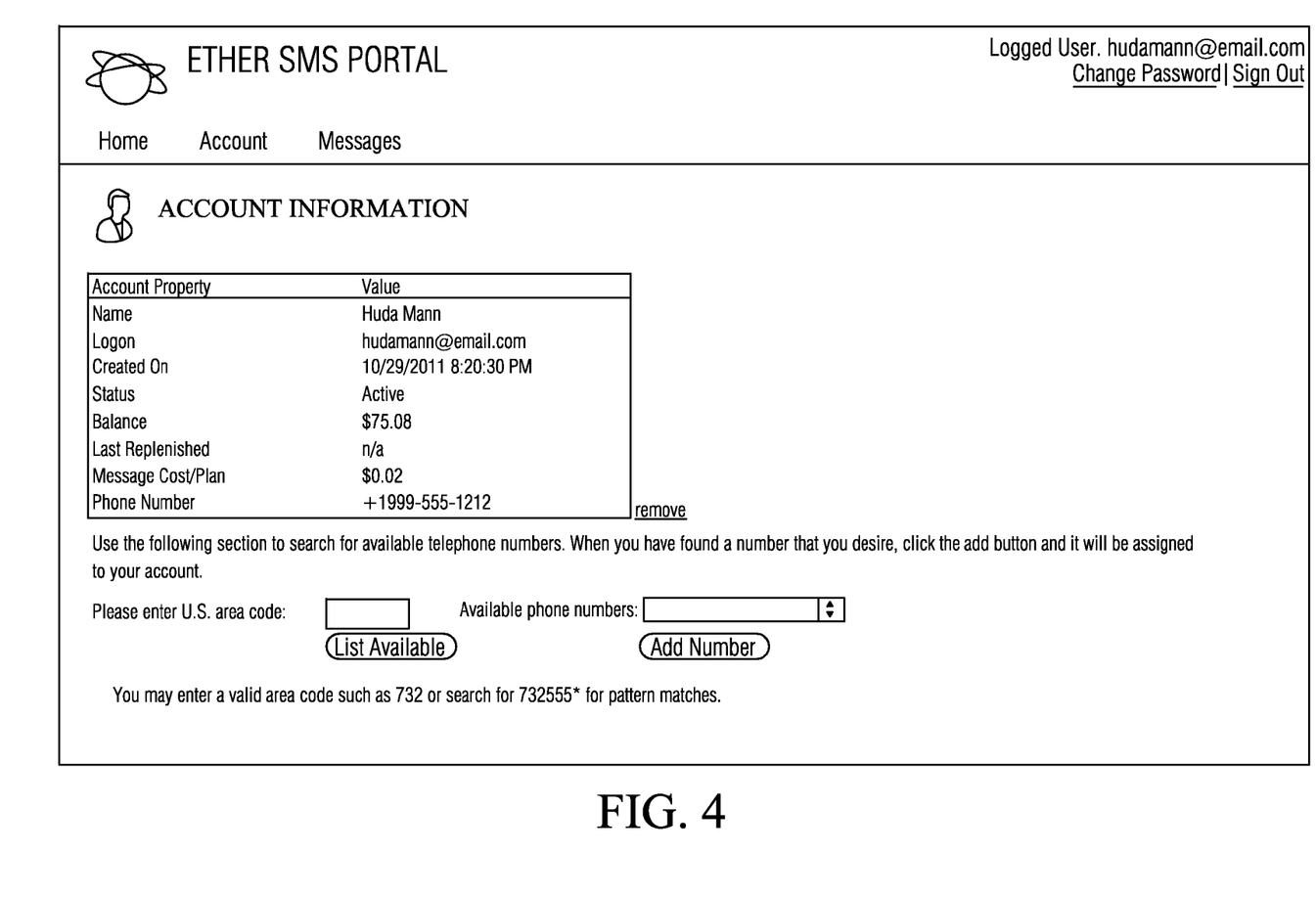
FIG. 4 is a sample of an example non-limiting web page allowing a customer to check the status of their etherSMS™ account and balance.

FIG. 4 depicts one illustrative embodiment of how the user can access their etherSMS™ account information. From this interface, a user will be able to check their balance, the DID that is assigned to the account, their username, modify their password, send and receive messages, etc., all through the web portal provided by the example non-limiting cloud services.

Figure 5:
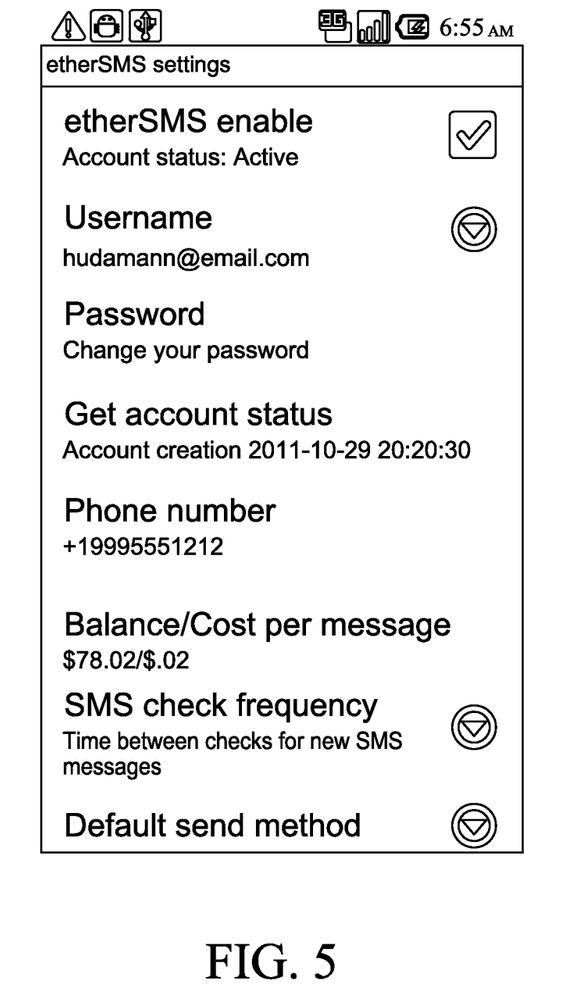
FIG. 5 depicts an illustrative example of how a user may enter/access account information via a mobile handset.

Alternatively, a customer can use an application such as described in the co-pending patent application noted above. By using such an application, customers can easily use gateway services for sending and receiving message oriented communications with peer devices. In one illustrative embodiment, FIG. 5 depicts how an application can provide access to the account information via its cloud services interface. Once example application is configured with the appropriate credentials to access the services, the user is able to send/receive short messaging service (SMS) or other message oriented communications via the standard cellular phone infrastructure and/or through cloud services. This can be done even on a contact or message-by-message basis.

Figure 6:
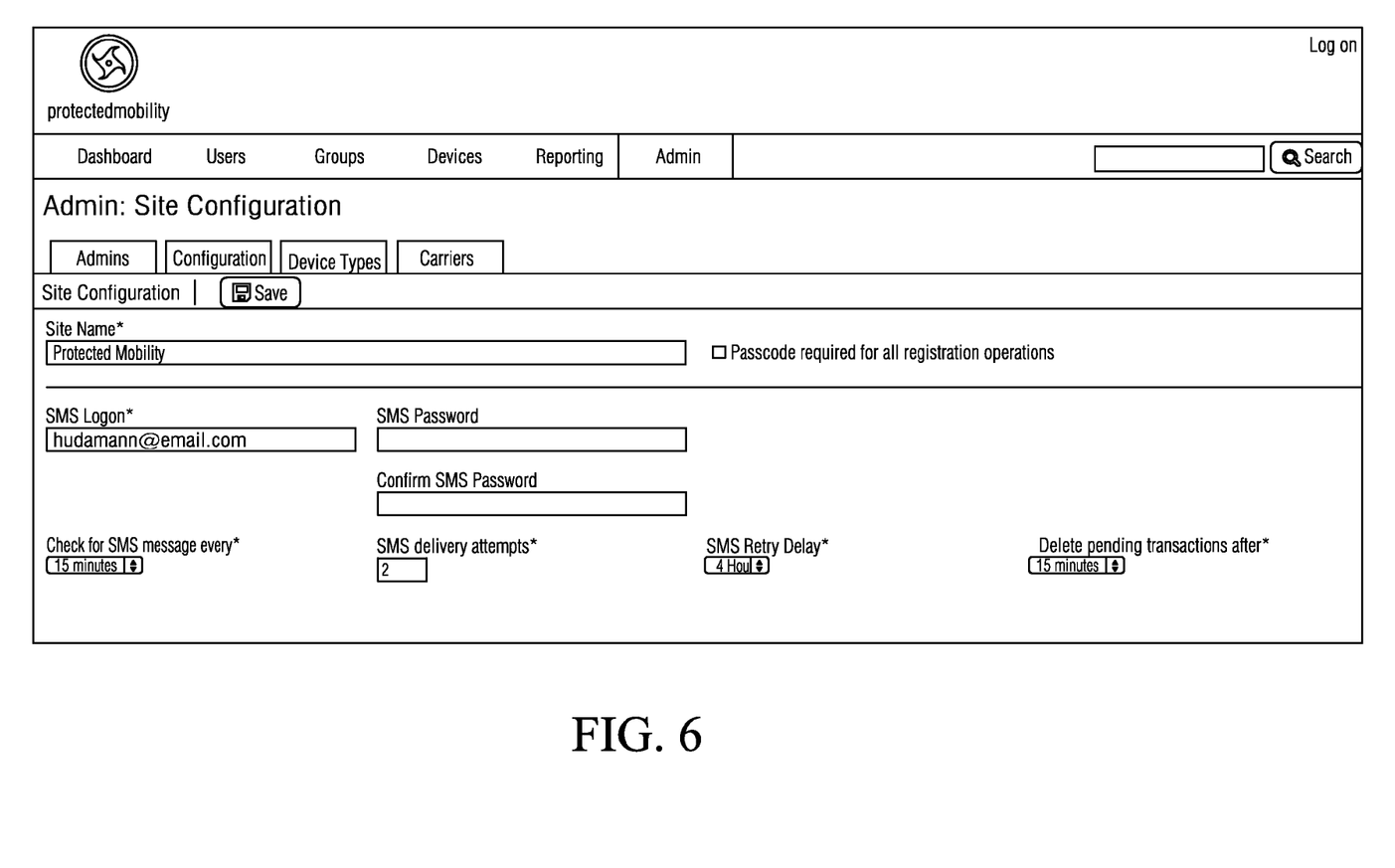
FIG. 6 depicts an illustration of how an operator may enter/access example non-limiting account information for an organization through a web interface.

In yet another illustrative embodiment, FIG. 6 depicts a web page or other display of an application that can be used by an organization to enter/access account information. Furthermore, due to the exposed cloud service interface, SMS and other message oriented communications can also be easily integrated into an application. For instance an exemplary illustrative non-limiting Enterprise Console (PMEC) can be used the exported web services of the API. The PMEC can be designed to use the cloud services to send/receive SMS or other message oriented communications to peer/client devices. The interface in FIG. 6 allows an operator to enter in the account credentials used to validate access to an organization's or individual's account. This information will be subsequently used during access to the cloud services.

Unlike other gateway services there is no requirement that a peer system have an associated account to correspond with a customer because of the DID associated with the account.

Additional benefits of the disclosed non-limiting message routing layer can also be realized in terms of security. One of the major issued today with standard SMS messaging is regarding privacy over cellular infrastructure. With the use of standard Internet protocols such as TLS/SSL to access its cloud service APIs the contents of the message not communicated in the clear, reducing the ability to eavesdrop by a malicious third party. Furthermore, if the intended recipient of the communiqué is also a customer, the message never needs to be routed outside the cloud service infrastructure, potentially never traversing a public network exposed as unsecured or clear text.

To further reduce the overhead of the communications between a client device and the rest of the system, the exemplary illustrative non-limiting Cloud Service Interface 14 has been designed in accordance with RESTful [Representational state transfer (REST)] web service principles. This reduces the number of interactions need to provide optimal performance to the consumer of services. This is significantly important to devices that are mobile, have limited bandwidth or not connected to a power grid.

Another important advantage of the example non-limiting cloud services 12 is its ability to simply enabled access to SMS or other message communications on devices that either have no cellular interface or limit access to messaging oriented communication services for a multitude of reasons, including but not limited to policy or security considerations. One such example would be Apple's iPhone or iPad products that utilize Apple's iOS operating system environment. Without breaching the security protocol of the phone or without special permission from Apple, developers are limited to what messaging services are available to use. By using the cloud services 14, message oriented applications can now be more easily developed.

etherSMS Messaging Routing Based on Identity

In its default configuration, the etherSMS cloud-based messaging services allow end-users to allocate a phone number for their mobile device whereby other users (internal and external to the system) may send and receive text messages using a mobile telephone network. As a user addresses a destination, they simply enter the target SMS(short messaging service) phone number for delivery. The preferred example embodiment will use its routing systems to determine if the number is "in-network" or requires delivery through one of its SMS (short messaging service) gateway providers.

Additional services can also be envisioned. As indicated previously, the cloud based messaging system allows a network identifier such as a phone number to be allocated for their SMS communications. In one non-limiting illustrative embodiment, this network identifier in many cases also serves as the DID, allowing of inbound communications with other SMS capable devices from other messaging infrastructures. However, there is a class of subscribers than may opt to only use the cloud base services for the messaging communications. Consider the scenario where at least two of a plurality of devices have associated accounts with the appropriate credentials to exchange messages. Given the fact that the cloud messaging service can exchange information between the two accounts, there may be no need to route the information through additional messaging infrastructure, potentially further defraying the cost of the exchange, and potentially increasing the security.

Additional cost saving may be further realized while further enhancing the usability of a messaging application. One non-limiting illustrative example where costs may further be reduces is regarding the DID or network identifier. For instance, a premium may be charged to acquire an externally routable network identifier/DID, potentially on a monthly basis. However since the cloud base messaging infrastructure does not require that a specific format of the network identifier/DID be used for "in network" messaging, any other unique token associated with an account may be used to appropriately route the communiqué. Therefore types of information that can be used as network identifier within the cloud messaging service can include, but not limited to email addresses, usernames that can be unique to a specific account, etc.

EXAMPLE

Non-DID Identifiers

Other permutations can be envisioned. Consider how common prior art SMS messaging applications operate on handsets. In a non-limiting example, a user may select a contact to send a text message to. The messaging application on the device maps the addressee's name to the appropriate phone number to address the message to. The user is not required to remember the phone number of the at least one of the plurality of peers he/she chooses to communicate with. However, if a different identifier were required for the cloud based messaging service, the subscriber would have to potentially go through extra steps to select the appropriate identifier. At best this could be another phone number the subscriber would have to enter/record it in the local contact list, and remember to choose the appropriate number based on the service he decides to use. On the other hand, if the cloud base service allowed for the unique identifier to be provided be used for "in-network" messaging, the phone number already assigned the device could be registered. In this way, any messages sent within the cloud base service could be routed similarly to those using more traditional messaging infrastructure. This may eliminate the requirement for the initiator of the communique to potentially select the correct identifier on a per message basis. The subscriber and/or application can then make a simpler choice of determining over what service it would prefer to send the message.

EXAMPLE

Random Code Authentication

Figure 7:
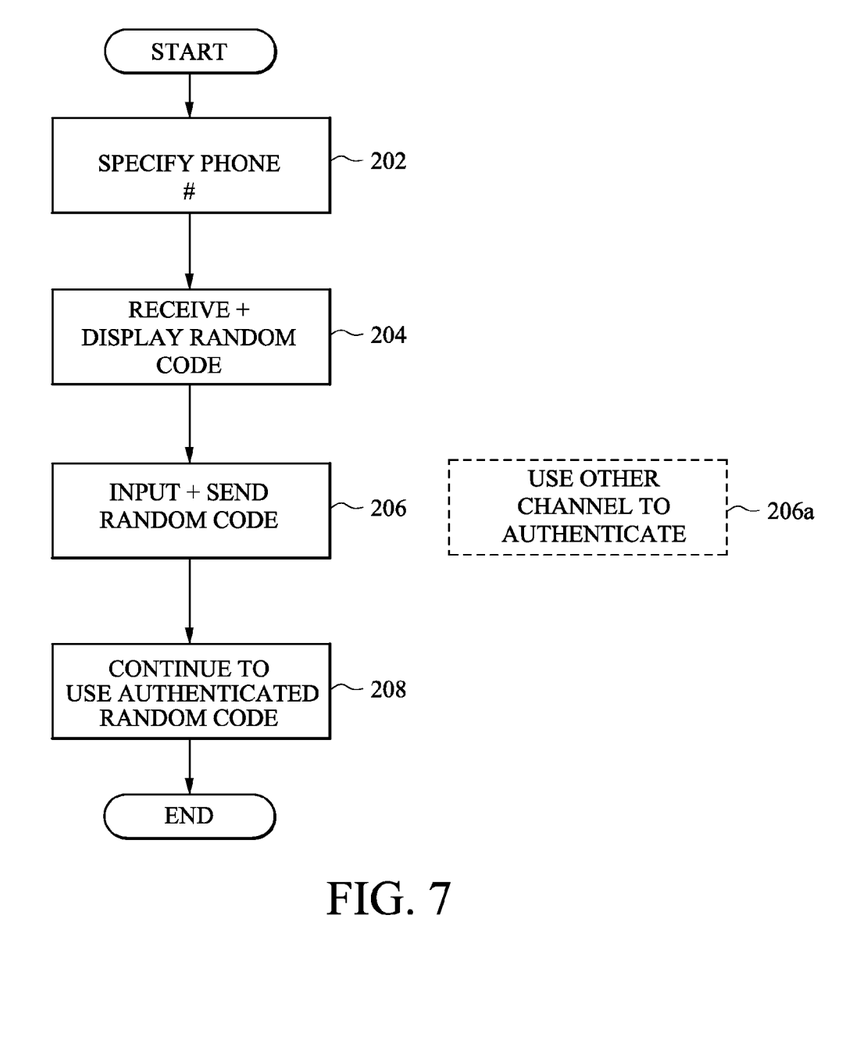
FIGS. 7 and 8 are additional non-limiting flowcharts.

To avoid spoofing or other nefarious use of these identifiers, in one exemplary embodiment, some additional steps may be taken by the cloud service to help determine the validity of a given network identifier. In an illustrative non-limiting example, methods may be implemented whereby an account owner may wish to specify an existing mobile phone's number as a means to route messages within the cloud services network. Using an account "portal", a cloud service subscriber may enter a mobile phone number as a form of additional routing information/network identifier for the account (FIG. 7, block 202). In the case of a phone number, the cloud service may then send a message containing a code such as a random number to the specified number enterer by the subscriber. Assuming the subscriber is in possession of the device, upon reception of the message, the device can display the code (FIG. 7, block 204). At this point, the subscriber can enter the code back into the cloud services portal (FIG. 7, block 206), closing the loop, thus allowing the cloud service to use the associated identifier for future routing of messages within the cloud service network (FIG. 7, block 208). Alternatively, the verification information exchange could be provided to the subscriber via another channel such as email, voice callback, etc. (FIG. 7, block 206a).

EXAMPLE

Multiple Devices

Figure 8:
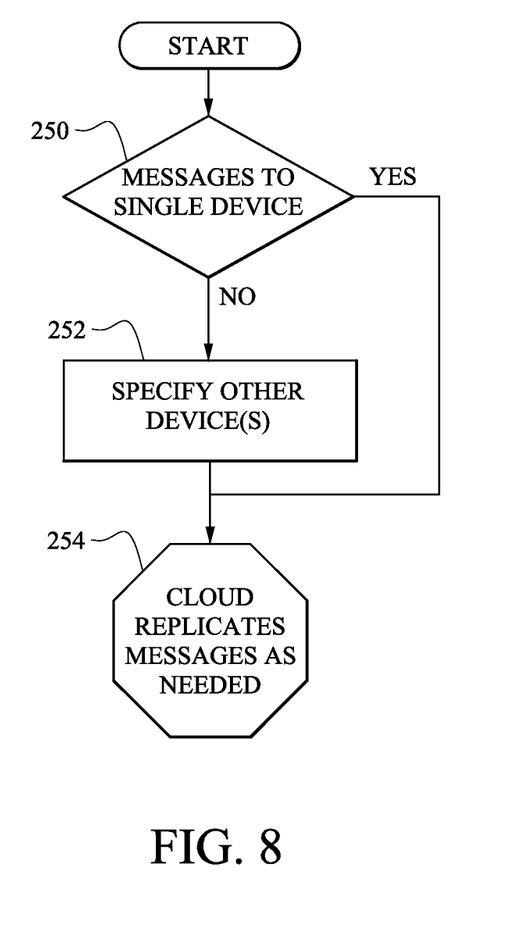

By allowing subscriber entered network identifiers for a given account, in another exemplary embodiment, it is possible to have multiple identifiers that are potentially associated with different devices. Consider the common use case where a single subscriber has both a cell phone and an Apple iPad (FIG. 8 block 250). To ensure that they kept apprised of all communications, a subscriber may elect to have all messages received and or sent through the cloud service to be replicate to the other devices associated with the account (FIG. 8 block 252). In this non-limiting embodiment, the subscriber would be able to maintain context of a communication's exchange, even when potentially switching between devices (FIG. 8 block 254).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. System providing connectivity between at least one of a cellular communications text messaging service and a further network, the system comprising:
a message router coupled to the cellular communications text messaging service and the further network, the message router including at least one processor configured to maintain user network identifiers identifying users on the further network, the at least one processor connected to a storage device that stores a directory of user accounts associated with the user network identifiers, at least one of the user accounts having at least one of a plurality of direct inward dialing numbers associated therewith, and the message router providing bridging services between the cellular communications text message service and the further network, the processor controlling the message router to route at least one of text messages associated with the at least one user account between the cellular communications text messaging service and the further network based at least in part on at least one of the plurality of direct inward dialing numbers to thereby provide network identity portability for said at least one user account across multiple network connections associated with said at least one user account.

2. The system of claim 1 wherein the at least one processor is configured to provide a portal that assigns Direct Inward Dialing (DID) telephone numbers for Short Message Service (SMS) text messaging over the Internet.

3. The system of claim 1 wherein the at least one processor charges user accounts on a per-message basis.

4. The system of claim 1 wherein the at least one processor is user-configurable to vary the time intervals at which the at least one processor checks for new SMS short messaging service text messages.

5. The system of claim 1 further enhanced to provide anonymizing services.

6. The system of claim 1 further including a movable command and control center that can connect bidirectionally via different network points and/or (IP) Internet Protocol addresses.

7. The system of claim 1 wherein the at least one processor changes IP Internet Protocol addresses on a per exchange basis.

8. The system of claim 1 wherein the at least one processor enables users to send text messages along with secure command and control information to SMS short messaging service text message enabled devices via a web interface.

9. The system of claim 1 further including a web interface coupled to the at least one processor, the web interface providing cellular SMS short messaging text generation capability over the Internet.

10. The system of claim 1 wherein the at least one processor provides one-to-many text messaging capabilities.

11. The system of claim 1 wherein the at least one processor provides input capability by a peer system thereby removing the requirement for an entity to open up access through a firewall or other defensive system for inbound communication.

12. The system of claim 1 wherein the at least one processor is configured to provide a portal that assigns Direct Inward Dialing (DID) telephone numbers for Multimedia Message Service (MMS) text messaging over the Internet.

13. Method providing connectivity between at least one of a cellular communications text messaging service and a further network, the method comprising:
using a message router coupled to the cellular communications text messaging service and the further network, the message router including at least one processor configured to maintain user network identifiers identifying users on the further network, the at least one processor connected to a storage device that stores a directory of user accounts associated with the user network identifiers, at least one of the user accounts having at least one of a plurality of direct inward dialing numbers associated therewith, providing bridging services between the cellular communications text message service and the further network by routing at least one of text messages associated with the at least one user account between the cellular communications text messaging service and the further network based at least in part on at least one of the plurality of direct inward dialing numbers thereby providing network identity portability for said at least one user account across multiple network connections associated with said at least one user account.

14. The method of claim 13 wherein the message router provides a portal that assigns Direct Inward Dialing (DID) telephone numbers for Short Message Service (SMS) text messaging over the Internet.

15. The method of claim 13 wherein the message router charges user accounts on a per-message basis.

16. The method of claim 13 further including user-configuring the message router to vary the time intervals at which the message router will check for new SMS short messaging service text messages.

17. The method of claim 13 further including providing anonymizing services.

18. The method of claim 13 further including providing a movable command and control center that can connect bidirectionally via different network points and/or (IP) Internet Protocol addresses.

19. The method of claim 13 further including changing IP Internet Protocol addresses on a per exchange basis.

20. The method of claim 13 further including enabling users to send text messages along with secure command and control information to SMS short messaging service text message enabled devices via a web interface.

21. The method of claim 13 further including providing, with a web interface, cellular SMS short messaging text generation capability over the Internet.

22. The method of claim 13 further including providing one-to-many text messaging capabilities.

23. The method of claim 13 further including providing input capability by a peer system thereby removing the requirement for an entity to open up access through a firewall or other defensive system for inbound communication.

24. The method of claim 13 further including providing a portal that assigns Direct Inward Dialing (DID) telephone numbers for Multimedia Message Service (MMS) text messaging over the Internet.

* * * * *